US008855422B2

(12) United States Patent
Free

(10) Patent No.: US 8,855,422 B2
(45) Date of Patent: *Oct. 7, 2014

(54) LIGHT SOURCE DETECTION FROM SYNTHESIZED OBJECTS

(71) Applicant: Apple Inc., Cupertino, CA (US)

(72) Inventor: Robert Mikio Free, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/659,643

(22) Filed: Oct. 24, 2012

(65) Prior Publication Data

US 2013/0050214 A1  Feb. 28, 2013

Related U.S. Application Data

(63) Continuation of application No. 12/693,437, filed on Jan. 25, 2010, now Pat. No. 8,315,461.

(51) Int. Cl.
G06K 9/00 (2006.01)
G01B 11/24 (2006.01)
G06T 15/50 (2011.01)

(52) U.S. Cl.
USPC ............ 382/181; 382/118; 356/601; 345/426

(58) Field of Classification Search
USPC ................. 382/117, 118, 167, 195, 254, 181;
345/419, 420, 426, 422, 582, 427, 653,
345/654; 356/601–613
See application file for complete search history.

(56) References Cited

U.S. PATENT DOCUMENTS

| 6,222,937 | B1* | 4/2001 | Cohen et al. | 382/154 |
|---|---|---|---|---|
| 6,525,725 | B1* | 2/2003 | Deering | 345/419 |
| 6,549,200 | B1* | 4/2003 | Mortlock et al. | 345/419 |
| 6,850,872 | B1* | 2/2005 | Marschner et al. | 703/2 |
| 6,903,741 | B2* | 6/2005 | Corbetta | 345/426 |
| 7,227,977 | B1* | 6/2007 | Dotsenko | 382/118 |
| 8,315,461 | B2* | 11/2012 | Free | 382/181 |
| 2009/0271078 | A1* | 10/2009 | Dickinson | 701/51 |

OTHER PUBLICATIONS

Hjelmas, Erik, et al., "Face Detection: A Survey", Computer Vision and Image Understanding 83, 2001, pp. 236-274, Academic Press.
Yang, Ming-Hsuan, et al., "Detecting Faces in Images: A Survey", IEEE Transactions on Pattern Analysis and MAchine Intelligence, Jan. 2002, pp. 34-58, vol. 24, No. 1.

(Continued)

*Primary Examiner* — Sheela Chawan
(74) *Attorney, Agent, or Firm* — Wong, Cabello, Lutsch, Rutherford & Brucculeri, LLP

(57) ABSTRACT

Methods, systems, and apparatus, including computer programs encoded on a computer storage medium, for determining a location relative to an object and a type of a light source that illuminated the object when the image was captured, are described. A method performed by a process executing on a computer system includes identifying an object of interest in a digital image. The method further includes projecting at least a portion of the digital image corresponding to the object of interest onto a three dimensional (3D) model that includes a polygon-mesh corresponding to the object's shape. The method further includes determining one or more properties of a light source that illuminated the object in the digital image at an instant that the image was captured based at least in part on a characteristic of one or more polygons in the 3D model onto which the digital image portion was projected.

34 Claims, 7 Drawing Sheets

(56) References Cited

OTHER PUBLICATIONS

Zhao, W., "Face Recognition: A Literature Survey", Dec. 2002, 399-458, 35(4), ACM Computing Surveys, US, 61 pages.

"Light Source Detection From Synthesized Objects", in Patent Search Report, Nov. 16, 2009, IP.com Security Innovation, 10 pages.

Brunelli, R., "Estimation of Pose and Illuminant Direction for Face Processing", 1997, Image and Vision Computing, 15:741-748, 8 pages.

Han, Heechut, "Face Relighting Based on Virtual Radiance Sphere and Reflection Coefficient", Feb. 2008, Optical Engineering, 47(2), 8 pages.

Tumblin, et al., "Two Methods for Display of High Contrast Images", Jan. 1999, ACM Transactions of Graphics, 18 (1):56-94, 20 pages.

* cited by examiner

LIGHT SOURCE DETECTION FROM SYNTHESIZED OBJECTS

BACKGROUND

This specification relates to light source detection from synthesized faces, for example, analyzing an image to detect a type and a relative location of a light source that illuminated an object in the image at the instant that the image was captured.

Information gathering agencies can use a variety of techniques for identifying a type and a location of a light source that illuminate a subject of a photograph. One such technique may include taking multiple photographs of the subject from different angles, followed by measuring the length of shadows cast by the subject in the respective photographs for each corresponding angle. Typically, analyzing the shadow-length measurements can be based on an assumption about the type of illuminating source: directional light or point light. Iterative testing of various locations where a point source or a directional source may have been placed may eventually lead to determining a light source location that best reproduces the shadow-length measurements.

SUMMARY

This specification describes technologies relating to detection of one or more light sources that illuminated an object in a two-dimensional image when the image was taken. The methods and systems disclosed in this specification enable determining a light source vector of directional light and a position of point light.

One aspect of the subject matter described in this specification can be implemented in methods performed by a process executing on a computer system. A method includes identifying an object of interest in a digital image. The method further includes projecting at least a portion of the digital image corresponding to the object of interest onto a three dimensional (3D) model that includes a polygon-mesh corresponding to the object's shape. The method also includes determining one or more properties of a light source that illuminated the object in the digital image at an instant that the image was captured based at least in part on a characteristic of one or more polygons in the 3D model onto which the digital image portion was projected.

Implementations can include any, all, or none of the following features. The determining of the one or more properties of the light source can include determining a type of the light source, a location of the light source or both. The method can include selecting a subset of polygons onto which the digital image was projected, the selection based on a predetermined criterion. The predetermined criterion can include a predetermined hue. The selecting can include identifying regions of the selected subset of polygons corresponding to portions of the digital image having the predetermined hue. The predetermined criterion can include a predetermined luminosity spatial frequency. The selecting can include identifying regions of the selected subset of polygons corresponding to portions of the digital image having a spatial-change in luminosity less than the predetermined luminosity spatial frequency. The method can include calculating a median luminosity over portions of the image corresponding to the selected subset of polygons; assigning a weight between zero and one to each polygon from the selected subset of polygons onto which the digital image was projected based on a luminosity relative to the calculated median of an associated portion of the digital image; and responsive to the weight of a polygon being larger than zero, identifying the polygon as a specular polygon.

In some implementations, the assigning can include associating a weight of zero to polygons corresponding to respective portions of the digital image having luminosity equal to or smaller than the calculated median luminosity; and associating a weight larger than 0 to polygons corresponding to respective portions of the digital image having luminosity larger than calculated median luminosity. The assigning can include associating a weight of zero to polygons corresponding to respective portions of the digital image having luminosity equal to or smaller than a predetermined luminosity threshold. The predetermined luminosity threshold can be larger than the calculated median luminosity. The assigning further includes associating a weight of one to polygons corresponding to respective portions of the digital image having luminosity larger than the predetermined luminosity threshold.

In some implementations, a characteristic of polygon can include direction of normal to polygon's face. Determining of the light source can include back-tracing rays that travel from a viewing location relative to the 3D model, to the identified specular polygons, then reflect off respective faces of the identified specular polygons in accordance with respective directions of the normals to the identified specular polygons' faces, and travel in a direction of the light source. The viewing location corresponds to a location relative to the object of a camera that captured the image of the object. For the back-traced rays reflecting off a certain group of polygons among the identified specular polygons to travel parallel to a certain direction relative to the 3D model, the method includes determining that the light source can be of directional-type and can be placed along the certain direction. For the back-traced rays reflecting off a particular group of polygons among the identified specular polygons to intersect at a particular point relative to the 3D model, the method includes determining that the light source a point type and can be placed at the particular point. The digital image can be a two-dimensional (2D) digital image, and the identified object of interest in the 2D digital image can be a human face.

In a second aspect, a computer storage medium encoded with a computer program, the program includes instructions that when executed by data processing apparatus cause the data processing apparatus to perform operations includes projecting onto the provided 3D model a color map corresponding to a light source that illuminated an object in an image at an instant that the image was captured. The 3D model includes a polygon-mesh corresponding to the object's shape. The apparatus further includes selecting specular regions of the projected color map. The specular regions are indicative of specular reflection of light from the light source. The apparatus further includes back-tracing rays that travel from a viewing location relative to the 3D model, to the selected specular regions, then reflect off the selected specular regions and travel in a direction of the light source. The viewing location corresponds to a location relative to the object of a camera that captured the image of the object. The apparatus further includes determining a location relative to the 3D model of the light source based on the back-traced rays reflecting off the selected specular regions.

Implementations can include any, all, or none of the following features. The determining can include for the back-traced rays reflecting off a certain group of regions among the selected specular regions to travel parallel to a certain direction relative to the 3D model, the apparatus further includes determining that the light source can be of directional-type and can be placed along the certain direction. For the back-traced rays reflecting off a particular group of regions among the selected specular regions to intersect at a particular point relative to the 3D model, the apparatus further includes determining that the light source a point type and can be placed at the particular point. The selecting of specular regions can include determining regions of interest of the projected color map based on a predetermined criterion; calculating a median of luminosity across the regions of interest. The luminosity represents a dimension in a hue-saturation-luminosity color space (HSL) corresponding to a brightness of a color along a lightness-darkness axis; and assigning a weight between zero and one to each of the regions of interest based on an associated luminosity relative to the calculated median. A weight larger than zero denotes a region selected as a specular region, and a weight of zero denotes a region not selected as specular region.

In some implementations, the assigning can include associating a weight of zero to regions having luminosity equal to or smaller than the calculated median luminosity, and associating a weight larger than 0 to regions having luminosity larger than calculated median luminosity. The computer storage medium can include correlating the back-traced rays reflected off the selected specular regions at least in part based on the respective weights of the selected specular regions. The assigning can include associating a weight of zero to regions having luminosity equal to or smaller than predetermined luminosity threshold. The predetermined luminosity threshold can be larger than the calculated median luminosity, and associating a weight of one to regions having luminosity larger than the predetermined luminosity threshold. The predetermined criterion can include a predetermined hue. The determining of regions of interest can include identifying regions of the projected color map having the predetermined hue. The predetermined criterion can include a predetermined luminosity spatial frequency. The determining of regions of interest can include identifying regions of the projected color map having a spatial-change in luminosity less than the predetermined luminosity spatial frequency. A region of the projected color map can include one of: a contiguous area of a pixels can included in a polygon; all pixels can included in a polygon; a contiguous group of neighboring polygons can included in the polygon-mesh; a planar-surface corresponding to a linear-surface-fit of the contiguous group of neighboring polygons; or a spline-surface corresponding to a non-linear-surface-fit of the contiguous group of neighboring polygons.

In some implementations, the computer storage medium can include finding the viewing location based on information can include one or more of dimensions of the projected color map, dimensions of the object in the image, and the location and photometric parameters of the camera that captured the image of the object. The back-tracing of rays can further include reflecting the back-traced rays in accordance with planar-surface reflection off polygons can included in portions of the polygon-mesh corresponding to the selected specular regions. The back-tracing of rays can further include reflecting the back-traced rays in accordance with curved-surface reflection off spline surfaces generated over neighboring polygons can included in portions of the polygon-mesh corresponding to the selected specular regions.

In a third aspect, a computer system includes a data processor communicatively coupled with a data storage device and with a user device. The data processor is configured to receive, from the user device, a two dimensional (2D) digital image of a face. The system further includes providing, from the data storage device, a three-dimensional (3D) model that includes a polygon-mesh corresponding to the face's shape. The system further includes projecting onto the provided 3D model a color map corresponding to a light source that illuminated the face in the 2D digital image at an instant that the 2D digital image was captured. The system further includes selecting specular regions of the projected color map. The specular regions are indicative of specular reflection of light from the light source. The system further includes back-tracing rays that travel from a viewing location relative to the 3D model, to the selected specular regions, then reflect off the selected specular regions and travel in a direction of the light source. The viewing location corresponds to a location relative to the face of a camera that captured the 2D digital image of the face. The system further includes for the back-traced rays reflecting off a certain group of regions among the selected specular regions to travel parallel to a certain direction relative to the 3D model, determining that the light source is of directional-type and is placed along the certain direction. The system further includes for the back-traced rays reflecting off a particular group of regions among the selected specular regions to intersect at a particular point relative to the 3D model, determining that the light source a point type and is placed at the particular point.

Implementations can include any, all, or none of the following features. The selecting of specular regions can include determining regions of interest of the projected color map based on a predetermined criterion; calculating a median of luminosity across the regions of interest. The luminosity represents a dimension in a hue-saturation-luminosity color space (HSL) corresponding to a brightness of a color along a lightness-darkness axis; and assigning a weight between zero and one to each of the regions of interest based on an associated luminosity relative to the calculated median. A weight larger than zero denotes a region selected as a specular region, and a weight of zero denotes a region not selected as specular region.

In some implementations, the providing can include if the 3D model of the face can be stored on a data storage device that can be communicatively coupled with the computer system, retrieving the stored 3D model of the face from the storage device, otherwise retrieving a 3D model of a generic face from the storage device, and modifying the shape of the 3D model of the generic face to match biometric characteristics of the face in the 2D digital image to obtain the 3D model of the face.

In some implementations, the 3D model can further include a neutral color map that covers each polygon of the polygon-mesh. The neutral color map corresponds to the 3D model illuminated by diffuse light such that each hue of the neutral color map can have a luminosity of 50%, the system can be further configured to synthesize a luminosity map that covers each polygon of the 3D model based on the determined light source. Responsive to overlaying the synthesized luminosity map on the neutral color map, reproducing a full-coverage color map that covers each polygon of the 3D model of the face, the reproduced full-coverage color map corresponding to the illumination conditions of the face when the 2D digital image was captured; and examining dark and bright patterns of the full-coverage color map over portions of the 3D model of the face. The examined portions correspond to areas of the face outside of a field of view in the 2D digital image.

In some implementations, the system is configured to correct the 2D digital image for illumination artifacts based on the determined type and location of the light source, and to perform face recognition for the face in the 2D digital image corrected for illumination artifacts. The correcting can include illuminating the 3D model of the face using the determined light source to obtain a synthetically illuminated color map of the face, determining a luminosity-difference between the synthetically illuminated color map of the face and the projected color map of the face, subtracting the determined luminosity-difference from the projected color map of the face to obtain a correction of the projected color map of the face; and mapping the correction of the color map from the 3D model of the face to the 2D digital image of the face to obtain a 2D digital image corrected for illumination artifacts.

Particular implementations of the subject matter described in this specification can be implemented to realize one or more of the following potential advantages. For example, once a location of an illumination point source has been identified using the technologies disclosed in this specification, an orientation of a subject in an image can be determined based on the identified position of the illumination point source.

Further, a user can correlate a directional light source's (e.g., the Sun's) attitude with a time when an image was captured to determine image location latitude. Conversely, a time of day can be determined knowing the attitude of the Sun and the latitude where the image was captured. In addition, if both time and latitude are known, one can determine the orientation of a subject in the image.

Furthermore, the methods and systems disclosed in this specification can be used to examine dark and bright patterns of a color map over portions of a 3D model of an object. The examined portions can correspond to areas of the object outside of a field of view in a 2D photograph of the object, while the examined patterns correspond to illumination conditions when the 2D photograph was taken.

The disclosed techniques can also be used to remove lighting artifacts (specular reflections, shadows, and the like) from a three-dimensional (3D) synthesized model of an object based on the position and the nature (type) of detected light sources. A color map of the 3D model corrected for illumination artifacts can be mapped back onto a two-dimensional (2D) image of the object to obtain a lighting-neutral texture for improved object correlation, matching and recognition.

Additionally, once the light sources illuminating one or more objects are identified, these can in turn be used as hints for recognizing shadows and highlights on other unrecognized objects, specifically providing hints regarding the unknown objects' shape, size and location.

Further, the identified light sources may also be used to provide hints for tracking the movement and orientation of recognized objects in subsequent frames of sequential images (e.g., videos)—reducing recognition time and improving accuracy. Furthermore, if positions of still objects are known and positions of light sources have been identified, one can determine the orientation and location of the capturing camera from sequential frames of a video.

Details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The methods and systems disclosed in this specification enable a user to determine a type and a location of one or more light sources that illuminated an object in a two-dimensional image when the image was captured. These methods can be implemented in image processing software.

Figure 1:
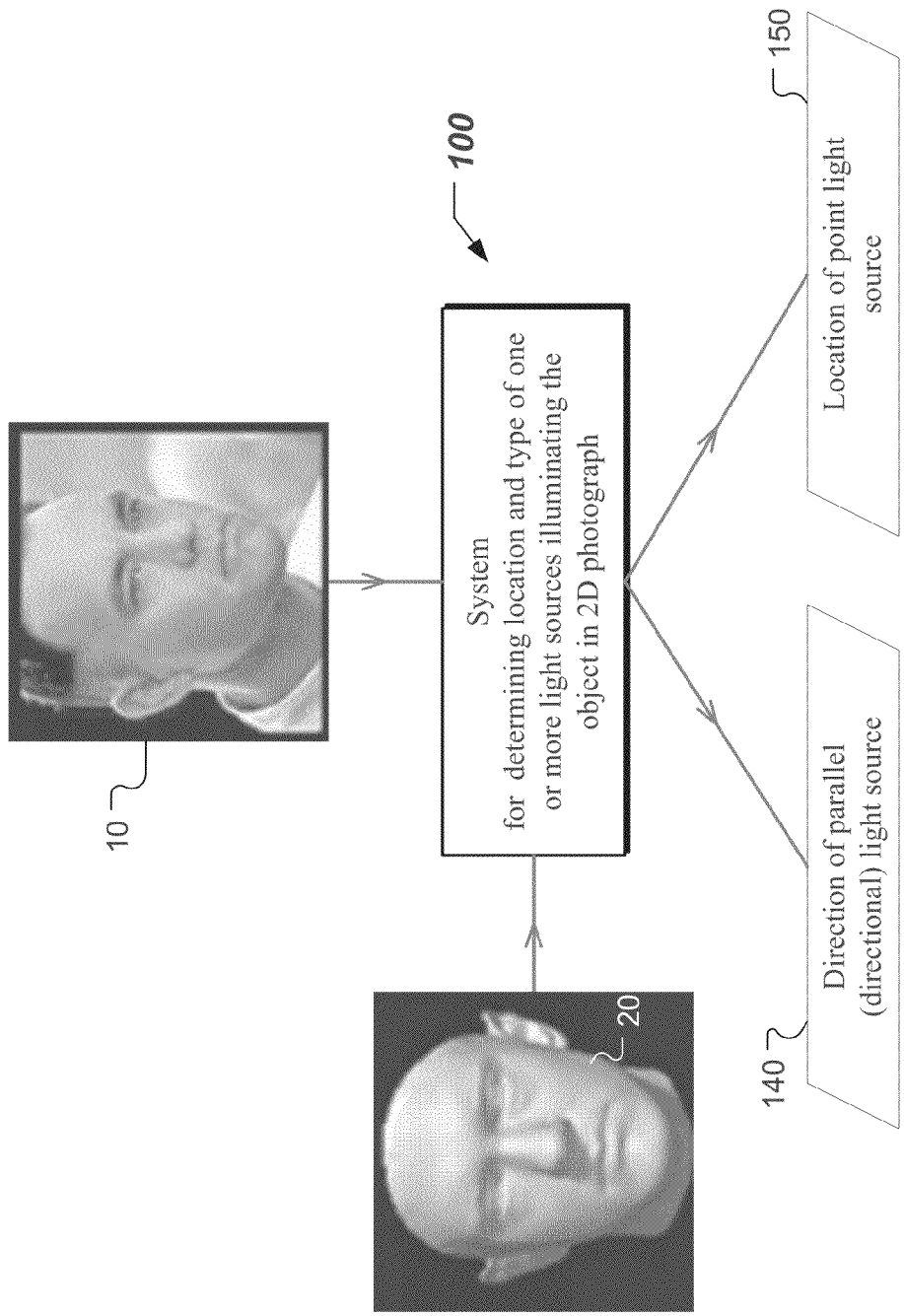
FIG. 1 shows an input-output diagram of a system for determining location and type of one or more light sources that illuminated an object when a two dimensional (2D) image of the object was captured.

FIG. 1 shows an input-output diagram of a system for determining location and type of one or more light sources that illuminated an object when a two dimensional (2D) image of the object was captured.

System 100 can include a data processor in communication with a user device and a storage device. A multitude of hardware and software representations of system 100 are described below in this specification. The data processor is configured to receive from a user an image of an object 10. The user may access system 100 via the user device. The user specified image 10 can be a two dimensional (2D) image of the object. For example, the user specified image can be a digital photograph or a frame of a movie. The object in the specified image can be a human face, an automobile, a china vase, and the like.

The data processor of system 100 is configured to determine a location relative to the object and a type of a given light source that illuminated the object when the specified image was captured. The processes implemented by the data processor are described in detail below in connection with FIGS. 2-3. The data processor is configured to operate on the user specified image 10 and on a three-dimensional (3D) model of the object 20. The 3D model 20 includes a polygon-mesh corresponding to the object's shape, and can be provided by system 100 in various ways, as described below in connection with FIG. 2.

Among other things, the data processor of system 100 is configured to project onto the provided 3D model 20 a color map corresponding to the object in the specified image 10. Further, the processes disclosed in this specification include generating, by the data processor, of one or more light sources for illuminating the 3D model to reproduce the projected color map. The one or more light sources generated by system 100 correspond to the one or more light sources that illuminated the object when the specified image of the object 10 was taken. For example, an output of system 100 can be a determined directional light source 140, characterized by a given direction relative to the object in image 10. Another output of system 100 can be a determined point light source 150, characterized by a given location relative to the object in image 10.

In some implementations, system 100 can be used to implement a process that includes identifying an object of interest in a digital image 10. The process can further include projecting at least a portion of the digital image 10 corresponding to the object of interest onto a 3D model 20 that includes a polygon-mesh corresponding to the object's shape.

The process is used for determining one or more properties of light sources that illuminated the object in the digital image 10 at an instant that the image was captured based at least in part on a characteristic of one or more polygons in the 3D model 20 onto which the digital image portion was projected. Determining properties of the light sources includes determining a type of light source or location of light source or both 140, 150. A characteristic of the polygon, used to determine the light sources, may be directions of normals to respective polygons' faces, for instance. The process implemented in system 100 also includes selecting a subset of polygons onto which the digital image was projected, the selected subset corresponding to portions of the image that satisfy certain predetermined criteria. Finally, as shown below in connection with FIGS. 2-3, characteristics of the selected set of polygons are being used to detect the light sources that illuminated the object in the digital image 10 at an instant that the image was captured.

Figure 2:
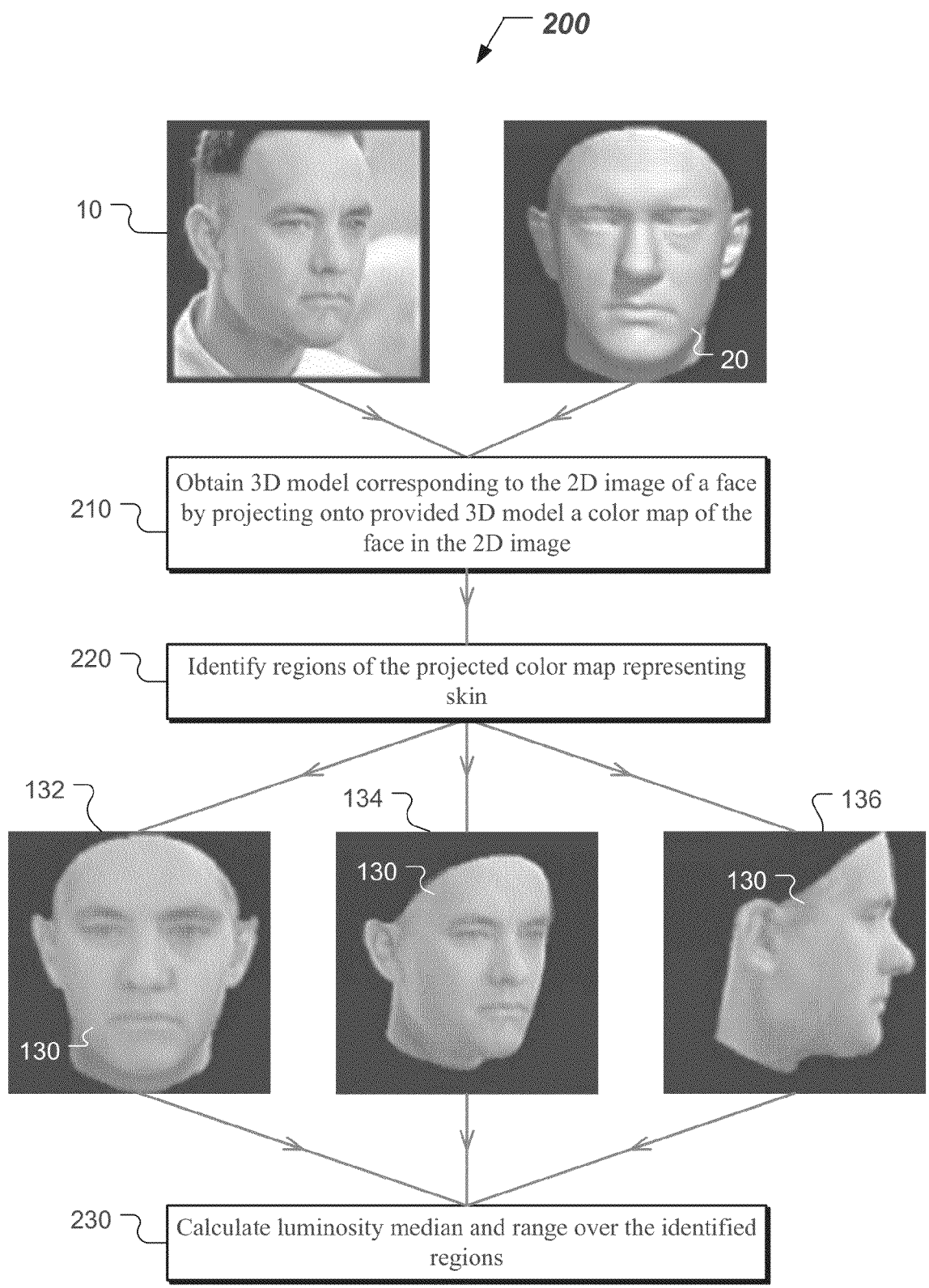
FIGS. 2 and 3 show flow charts of an example process for determining a light source to reproduce a projection of a color map corresponding to a face in a 2D image onto a three dimensional (3D) model of the face.
Figure 3:
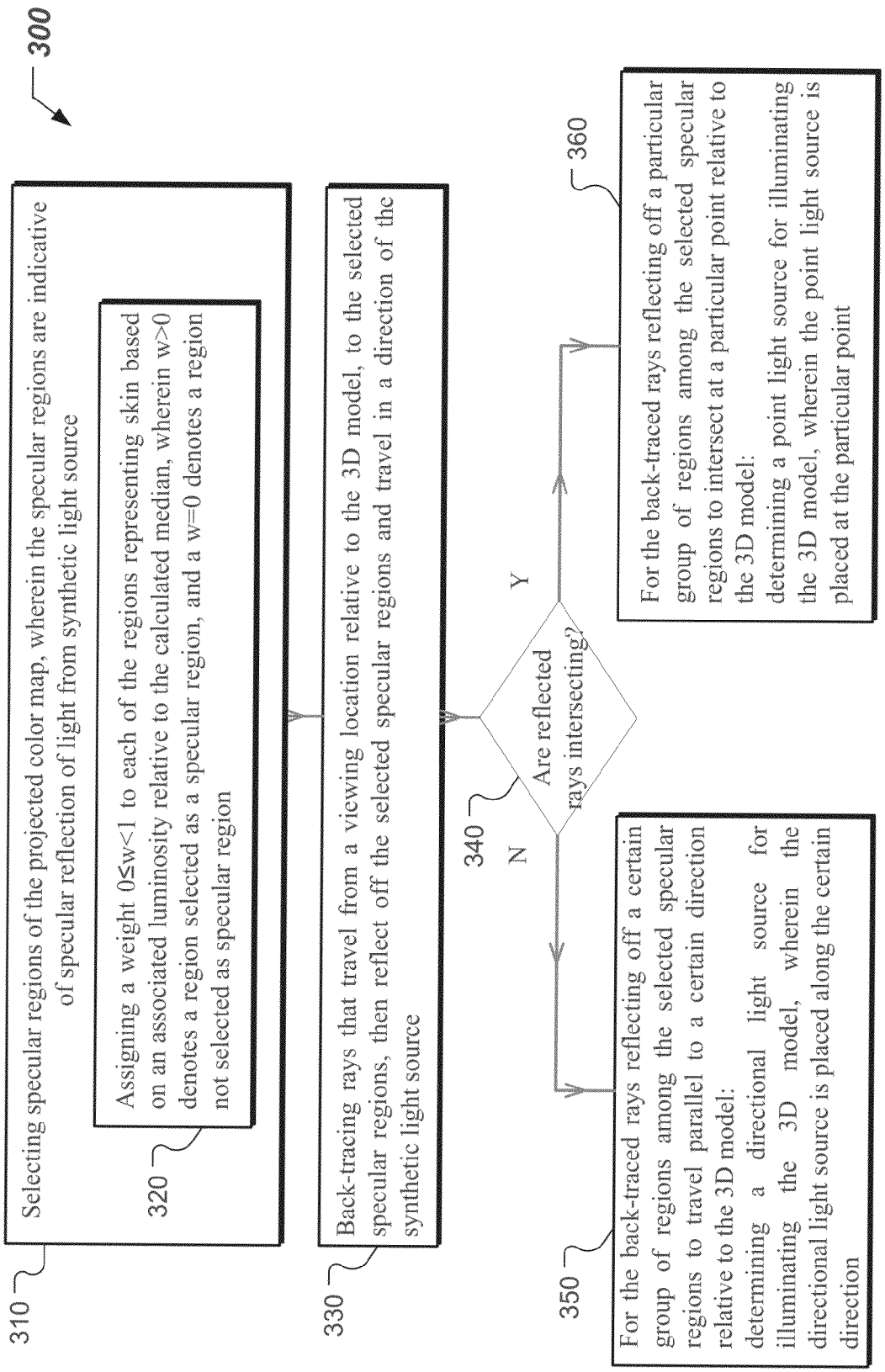

FIGS. 2 and 3 show flowcharts 200, 300 of an example process for determining a light source to reproduce a projection of a color map corresponding to a face in a 2D image onto a 3D model of the face. This process can be implemented, for example, in system 100. Although this example process is implemented to process a face, this technique can be applied to process other objects imaged in a 2D image. The process shown in flowchart 200 starts by obtaining 210 a 3D model of a face that corresponds to a 2D image the face.

To implement the obtaining 210 operation, the system 100 receives from the user the 2D image of the face 10 and provides the 3D model of the face 20. If the 3D model of the face 20 is stored on the data storage device that is part of system 100, the data processor is implemented to retrieve the stored 3D model of the face 20 from the storage device. Otherwise, the data processor can retrieve a 3D model of a generic face from the storage device. Subsequently, the data processor can modify the shape of the 3D model of the generic face to match biometric characteristics of the face in the 2D image to provide a corresponding 3D model.

Also as part of the obtaining 210 operation, system 100 can project onto the provided 3D model of the face 20 a color map corresponding to the face in the 2D image 10. In general, a color map can be represented using hexadecimal and RGB colors. Additionally, the color map can be represented in terms of Hue, Saturation, Lightness (HSL) values. A brief description of the HSL terms is included below for convenience.

Hue corresponds to a degree on the color wheel: 0 (or 360) is red, 120 is green, 240 is blue. Degree values in between the primary colors represent secondary colors and different shades of the primary and secondary colors. Examples of hues are aqua, blue, green, red, orange, etc. Saturation is a percentage value, where 100% is the full color. The saturation component goes from the fully saturated color to the equivalent gray. Luminosity (also called lightness or tone) is a property of a color, or the L-dimension of a color space, that is defined in a way to represent the subjective brightness perception of a color for humans along a lightness-darkness axis. Luminosity is also a percentage: 0% is dark (black), 100% is light (white), and 50% is the average (neutral). Equivalently, the luminosity spans the entire range from black through the chosen hue to white. The HSL representation can provide a very wide spectrum of available colors and tones.

The process shown in flowchart 200 continues by identifying 220 regions of interest of the projected color map. The term region (e.g., as in region of interest, or later as in specular region) is used in this specification to mean one of (i) a contiguous area of a pixels included in a polygon; (ii) all pixels included in a polygon; (iii) a contiguous group of neighboring polygons included in the polygon-mesh; (iv) a planar-surface corresponding to a linear-surface-fit of the contiguous group of neighboring polygons; or (v) a spline-surface corresponding to a non-linear-surface-fit of the contiguous group of neighboring polygons. The determination of the regions of interest of the projected color map can be based on a predetermined criterion. One such criterion may be a predetermined hue, and the regions of interest can be identified 220 as regions of the projected color map having the predetermined hue. The criterion may also include a predetermined luminosity spatial frequency (i.e., the change in luminosity over an area), and the regions of interest can be identified 220 as regions of the projected color map having a spatial-change in luminosity less than the predetermined luminosity spatial frequency.

In the case illustrated in FIG. 2 when the object represents a face, the area of interest can represent skin. There may be different techniques to determine whether a region of interest represents skin. One such technique for detecting skin includes (i) checking a hue of the pixels in each of the polygons of the polygon-mesh 20, and (ii) verifying that the luminosity undergoes a low (spatial) frequency change (i.e., the luminosity stays stable and smooth within a polygon, or across neighboring polygons.) To represent skin, the regions may be characterized by an orange hue and a luminosity within a predetermined luminosity range of the orange hue. To validate the assignment of a region to skin, the data processor of system 100 can verify whether the tone (luminosity) of the detected orange hue involves low spatial-frequency changes. If the verification is positive, the analyzed region is confirmed to represent skin (in contrast, e.g., with cloth texture characterized by high frequency tone changes.) For example, the data processor implementing the process shown in flowchart 200 identified regions 130 of the projected color map to represent skin. Panels 132, 134 and 136 illustrate multiple views of the skin regions 130.

The process shown in flowchart 200 continues by calculating 230 a median of luminosity (Lm) across the region(s) of interest. This operation establishes a baseline luminosity for the identified skin region 130 to account for skin having naturally a darker or a lighter tone of orange depending on ethnicity, for instance. Thus the median luminosity of the skin color (the tone of the skin) can be calculated 230 as a median luminosity of the skin hue over the polygons determined to represent skin 130. Once the median luminosity has been found, system 100 can determine a luminosity difference between each pixel (or each polygon) and the calculated median luminosity of the skin region 130. Highlights of the skin may have luminosity values above the calculated median, and shadows cast on the skin may have values below the calculated median.

The process continues as shown in flowchart 300 of FIG. 3 by selecting 310 specular regions among the identified regions of interest 130 of the projected color map. The specular regions are indicative of specular reflection of light from the light source. The selecting operation 310 includes assigning 320 a weight between zero and one ($0 \leq w \leq 1$) to each of the regions of interest based on an associated luminosity relative to the calculated median. For example, a weight larger than zero ($0<w$) corresponds to a specular region, and a weight of zero ($w=0$) denotes a region that is not a specular region.

In some implementations, a weight of zero ($w=0$) can be associated to regions having luminosity equal to or smaller than the calculated median luminosity ($L \leq Lm$), and a weight larger than zero ($0<w$) can be associated to regions having luminosity larger than calculated median luminosity ($Lm<L$).

Based on this approach, regions that have values of luminosity that are a large in comparison to the median luminosity Lm are more likely (with higher confidence) part of a specular region. For example, if skin represents a perfect mirror (e.g., "skin"-shell of a robot), light rays from a light source reflect off a small area (one point) of the shell to travel towards the camera (or the eye.) However unlike the robot's shell, human skin reflects light diffusely because the skin scatters the light of a source in a diffuse manner. In view of the above reasons, regions of skin that have high levels of luminosity may be selected as specular regions with a high certainty.

In other implementations, a weight of zero (w=0) can be associated to regions having luminosity equal to or smaller than a predetermined luminosity threshold (L≤Lt). The predetermined luminosity threshold can be chosen to be larger than the calculated median luminosity (Lm<Lt). In these other implementations, a weight of one (w=1) can be assigned to regions having luminosity larger than the predetermined luminosity threshold (Lt≤L). Therefore, the confidence for identifying specular regions can be expressed in terms of a luminosity predetermined threshold. For example, a first set of regions having respective luminosities above the predetermined threshold (Lt≤L) can be identified with high confidence as a set of specular regions, and can be used to perform ray analysis for determining the location and type of illumination sources.

The process shown in flowchart 300 continues by back-tracing 330 rays that travel from a viewing location relative to the 3D model, to the selected specular regions, then reflect off the selected specular regions and travel in a direction of a light source. The viewing location corresponds to a location relative to the object of a camera that captured the specified image of the object (of the face, in this example). The viewing location can be provided to system 100 in the form of metadata along with the received image of the object 10. However, the viewing location may not be available as input to system 100. In the later case, the data processor can be configured to determine the viewing location based on information relating to one or more of (i) dimensions of the projected color map, (ii) dimensions of the object and of the object image, and (iii) the location and photometric parameters of the camera that captured the specified image of the object. Examples of such photometric parameters are a focal length and magnification of a camera lens, and the like.

The operation of back-tracing of rays 330 can be implemented based on a variety of ray-tracing techniques. In some implementations, the back-traced rays can reflect off polygons included in portions of the polygon-mesh corresponding to the selected specular regions in accordance with planar-surface reflection. This first category ray tracing technique may be faster but less accurate than other ray tracing techniques. In other implementations, the back-traced rays can reflect off spline surfaces generated over neighboring polygons included in portions of the polygon-mesh corresponding to the selected specular regions in accordance with curved-surface reflection. This second category ray tracing technique may be more accurate but slower than other ray tracing techniques.

If a weighing technique is being applied in identifying the specular regions in accordance to operations 310, 320, all regions identified to represent skin 130 can be used in the foregoing ray analysis by correlating the back-traced rays reflected off the selected specular regions, at least in part based on the respective weights of the selected specular regions. The weight can be defined in terms of the luminosity delta of a certain region from the median luminosity calculated over all regions of interest. If the luminosity delta is close to zero, the weight of that region may be chosen to be small, while if the luminosity delta is large, the weight of that region may be chosen to be large. Alternatively, ray tracing 330 can be applied to specular regions identified to have delta luminosity above a predetermined threshold.

The process shown in flowchart 300 continues by examining 340 the paths of the rays reflected off the selected specular regions. As a result of the examination 340, the data processor of system 100 can determine that the back-traced rays reflect off a certain group of regions among the selected specular regions to travel parallel to a certain direction relative to the 3D model. In this case, the data processor is configured to determine 350 a directional light source for illuminating the 3D model. The directional light source is placed along the certain direction, and as described above, corresponds to the given source that illuminated the face when the 2D image of the face was captured. Therefore, system 100 has determined a directional-type of the given light source and a location of the given light source along a given direction relative to the object corresponding to the certain direction of the directional light source relative to the 3D model.

Figure 4A:
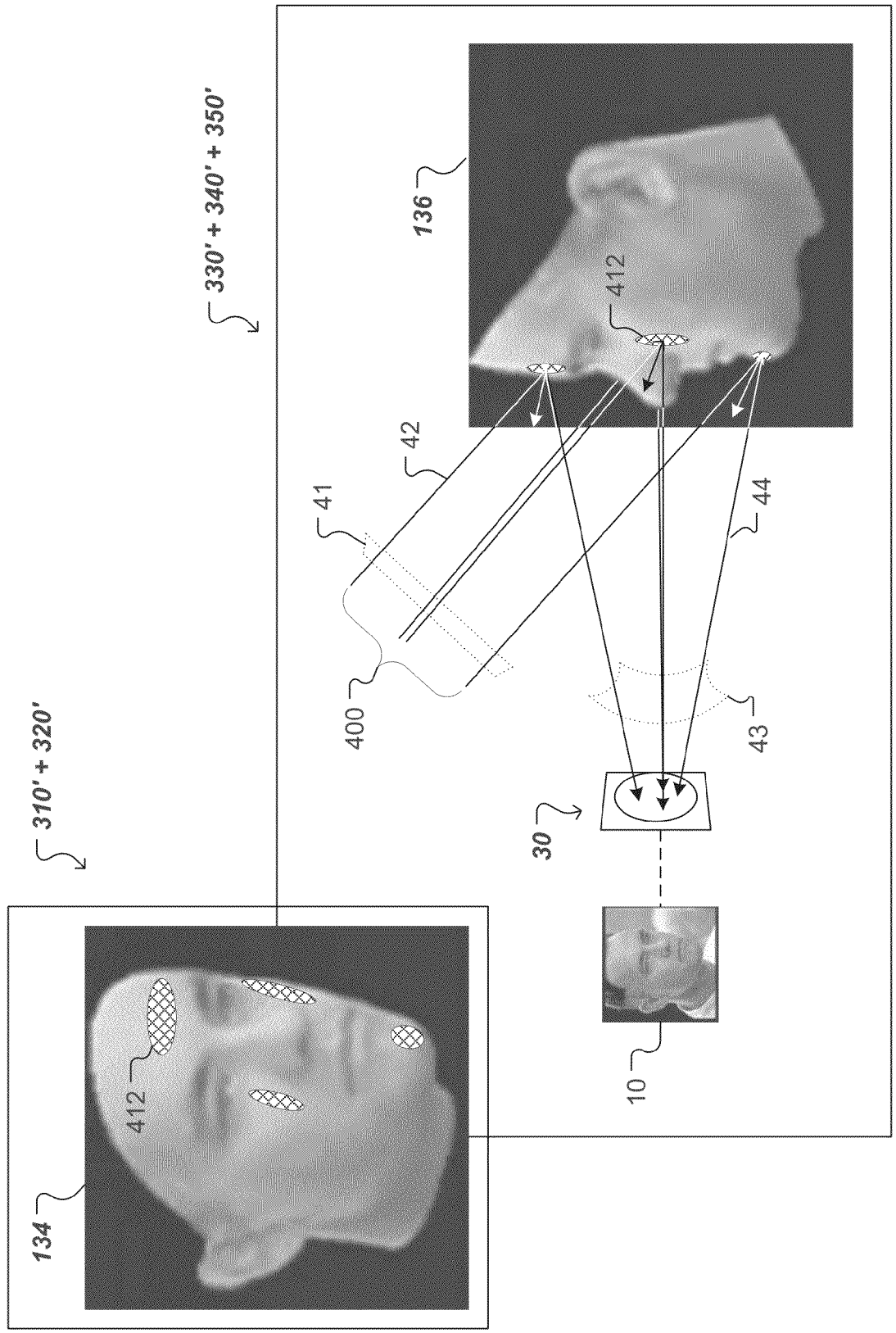
FIGS. 4A and 4B show aspects of an example process for determining a light source that illuminates a 3D model of a face.

FIG. 4A illustrates aspects of the example process shown in flowchart 300. The panel labeled 310'+320' (corresponding to operations 310 and 320) depicts a view 134 of regions identified as skin of the projected color map. The underlying polygon-mesh is not shown (for clarity) except for the regions 412 selected as specular regions. In this example, the selection of the specular regions 412 is based on a threshold: only regions having luminosity above a predetermined threshold (Lt<L) can be included in the specular regions 412. Further, a weight of one (w=1) is associated to each of specular regions 412, which means that each of specular regions 412 contributes equally to the subsequent ray analysis depicted in the panel labeled 330'+340'+350' (corresponding to operations 330, 340 and 350.) Furthermore as described above, each of specular regions 412 can represent either (i) a planar-surface corresponding to a linear-surface-fit of a contiguous group of neighboring polygons, or (ii) a spline-surface corresponding to a non-linear-surface-fit of the contiguous group of neighboring polygons.

The panel labeled 330'+340'+350' depicts a view 136 of the 3D model including regions identified as skin of the projected color map. Further, this panel illustrates the viewing location 30 relative to the 3D model. The image of the face 10 was captured by a camera located at a given location relative to the face corresponding to the viewing location 30 relative to the 3D model. Rays 44 that originate at viewing location 30 can have a non-planar wavefront 43 and can be back-traced to the selected specular regions 412. The back-traced rays can reflect off the selected specular regions 412 according to planar-surface reflection if the specular regions represent a planar-surface corresponding to a linear-surface-fit. Alternatively, the back-traced rays can reflect off the selected specular regions 412 according to curved-surface reflection if the specular regions represent a spline-surface corresponding to a non-linear-surface-fit. The reflected-off rays 42 can have a planar wavefront 41 and can travel along a direction 400 relative to the 3D model. Therefore, a directional light source can be located along direction 400 relative to the 3D model.

In the example aspect illustrated in FIG. 4A, all of rays 42 reflected off the selected specular regions 412 travel along direction 400, which causes the data processor to determine one directional light source for illuminating the 3D model to reproduce the projected color map that corresponds to the face in the 2D image 10. In another example, however, light rays may reflect off a first group of specular regions to travel parallel to a first direction, and other light rays may reflect off a second group of specular regions to travel parallel to a second direction. In this later example, the first and second directions can define two directional light sources illuminating the 3D model.

Returning to FIG. 3, as a result of the examination 340, the data processor of system 100 can determine that the back-traced rays reflect off a particular group of regions among the selected specular regions to intersect at a particular point relative to the 3D model. In this case, the data processor is configured to determine 360 a point light source for illuminating the 3D model. The point light source is placed at the particular point, and as described above, corresponds to the given source that illuminated the face when the 2D image of the face was captured. Therefore, system 100 has determined a point-type of the given light source and a location of the given light source at a given point relative to the object corresponding to the particular point of the point light source relative to the 3D model.

Figure 4B:
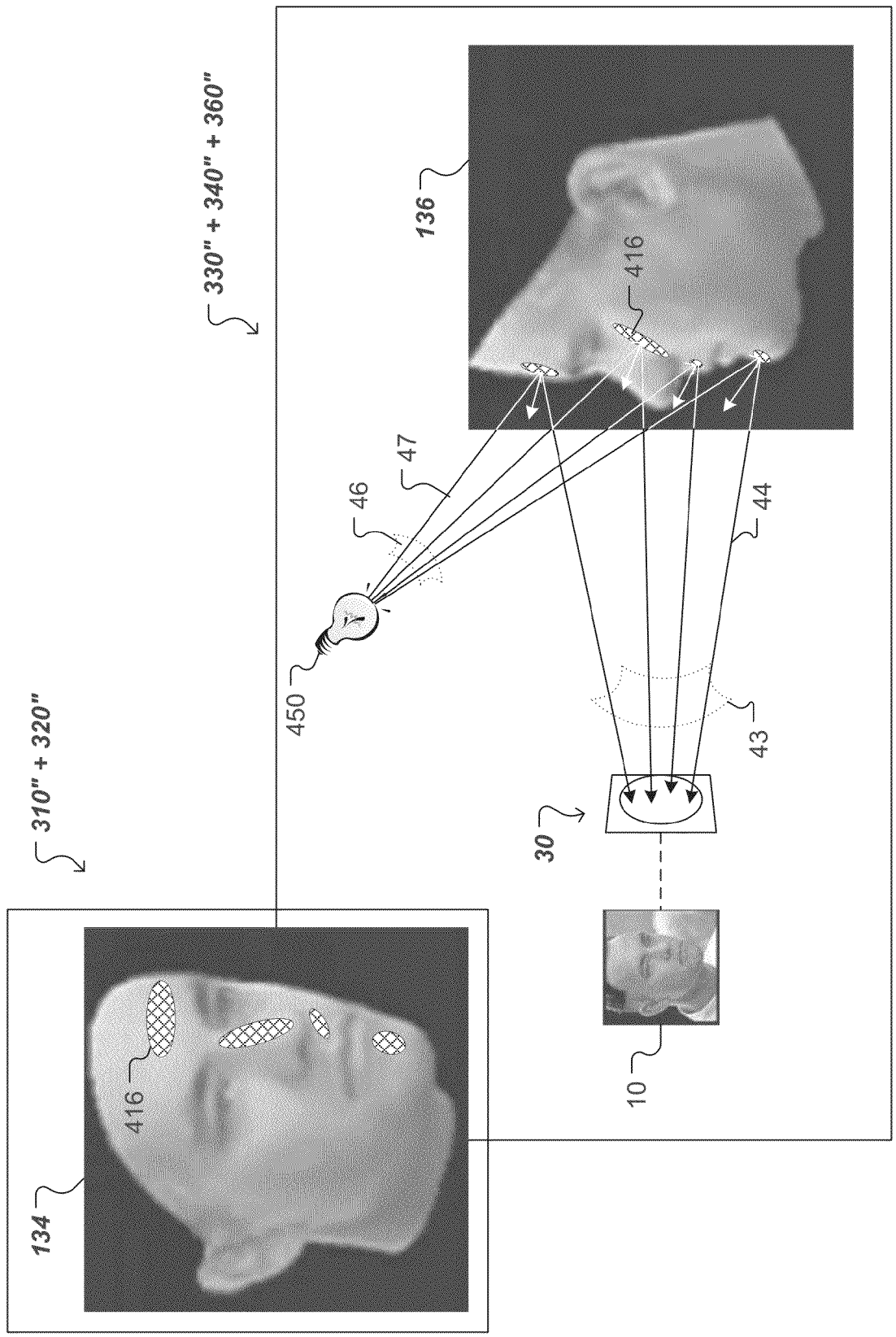

FIG. 4B illustrates aspects of the example process shown in flowchart 300. The panel labeled 310"+320" (corresponding to operations 310 and 320) depicts a view 134 of regions identified as skin of the projected color map. The underlying polygon-mesh is not shown (for clarity) except for the regions 416 selected as specular regions. In this example, the selection of the specular regions 416 is based on a threshold: regions having luminosity above a predetermined threshold (Lt<L) can be included in the specular regions 416. Further, a weight of one (w=1) is associated to each of specular regions 416, which means that each of specular regions 416 contributes equally to the subsequent ray analysis depicted in the panel labeled 330"+340"+360" (corresponding to operations 330, 340 and 360.) Furthermore as described above, each of specular regions 416 can represent either (i) a planar-surface corresponding to a linear-surface-fit of a contiguous group of neighboring polygons, or (ii) a spline-surface corresponding to a non-linear-surface-fit of the contiguous group of neighboring polygons.

The panel labeled 330"+340"+360" depicts a view 136 of the 3D model including regions identified as skin of the projected color map. Further, this panel illustrates the viewing location 30 relative to the 3D model. The image of the face 10 was captured by a camera located at a given location relative the face corresponding to the viewing location 30 relative to the 3D model. Rays 44 that originate at viewing location 30 can have a non-planar wavefront 43 and can be back-traced to the selected specular regions 416. The back-traced rays can reflect off the selected specular regions 416 according to planar-surface reflection if the specular regions represent a planar-surface corresponding to a linear-surface-fit. Alternatively, the back-traced rays can reflect off the selected specular regions 416 according to curved-surface reflection if the specular regions represent a spline-surface corresponding to a non-linear-surface-fit. The reflected-off rays 47 can have a non-planar wavefront 46 and can intersect at a particular point 450 relative to the 3D model. Therefore, a point light source can be located at the particular point 450 relative to the 3D model.

In the example aspect illustrated in FIG. 4B, all of rays 47 reflected off the selected specular regions 416 intersect at the particular point 450, which causes the data processor to determine one point light source for illuminating the 3D model to reproduce the projected color map that corresponds to the face in the 2D image 10. In another example, however, light rays may reflect off a first group of specular regions to converge to a first point, and other light rays may reflect off a second group of specular regions to converge to a second point. In this later example, the first and second points can define locations of two point light sources illuminating the 3D model.

System 100 can be used to implement the process shown in flowcharts 200, 300 for examining dark and bright patterns over portions of a 3D model of an object. The examined portions may correspond to areas of the object outside of a field of view in a 2D photograph, and the dark and bright patterns correspond to illumination conditions when the 2D photograph was taken. For example, the 3D model 20 can further include a neutral color map that covers each polygon of the polygon-mesh (in 3D-space). The neutral color map corresponds to the object being illuminated by diffuse light, such that each hue of the neutral color map has a luminosity of 50%. Once the processes described previously in this specification are applied to determine the one or more light sources illuminating the 3D model, system 100 can synthesize a luminosity map that covers each polygon of the 3D model based on the one or more light sources. The synthetic luminosity map can be overlaid by system 100 on the neutral color map. Subsequently, the data processor of system 100 can reproduce a full-coverage color map that covers each polygon of the 3D model of the object. The reproduced full-coverage color map corresponds to the illumination conditions of the object when the 2D photograph was captured. In this fashion, a user of system 100 can examine dark and bright patterns of the full-coverage color map over portions on the 3D model of the object. The examined portions correspond to areas of the object outside of a field of view in the 2D photograph.

Figure 5A:
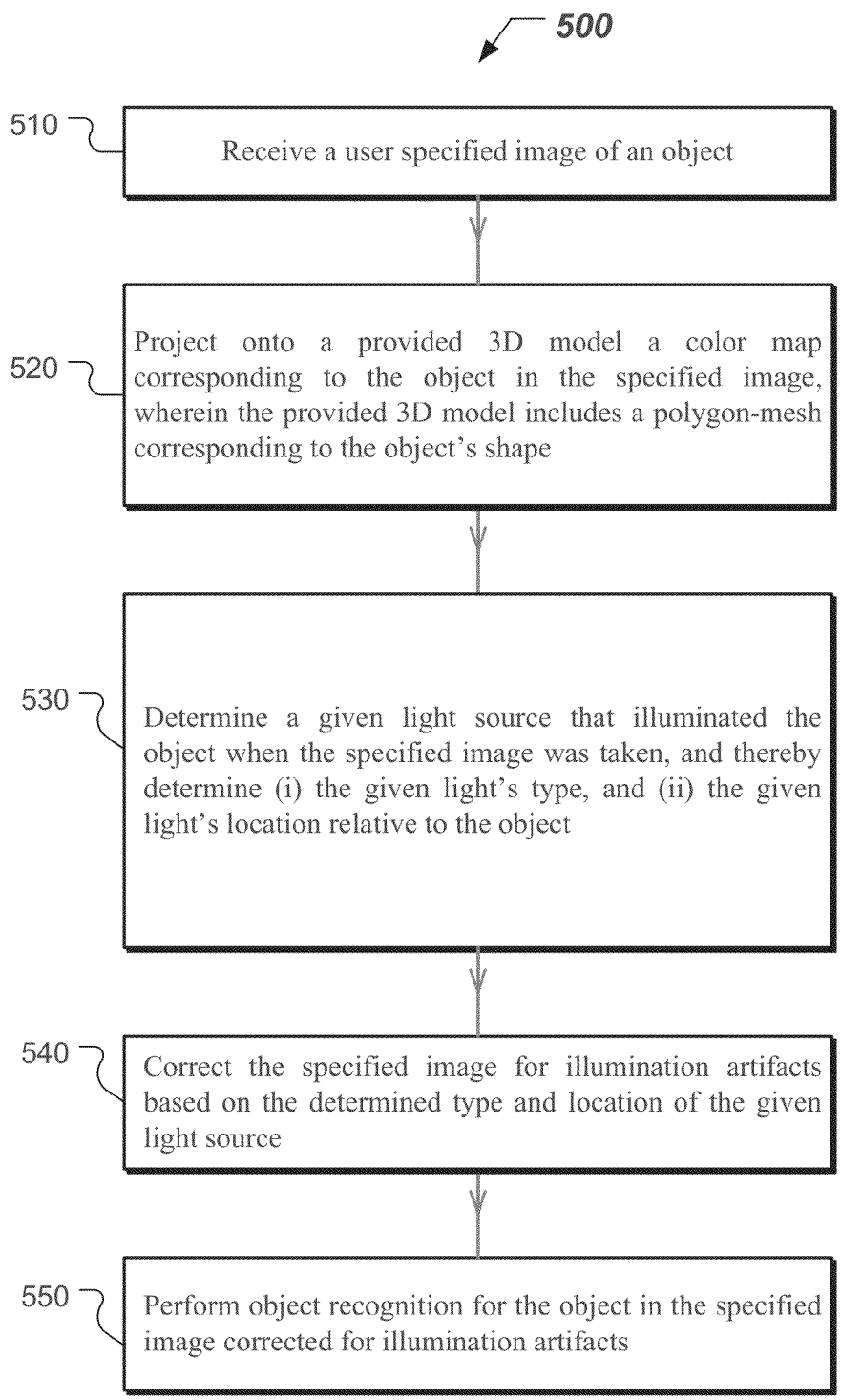
FIGS. 5A and 5B show flow charts of an example process for correcting a specified image of an object for illumination artifacts and for performing object recognition on the corrected image.
Figure 5B:
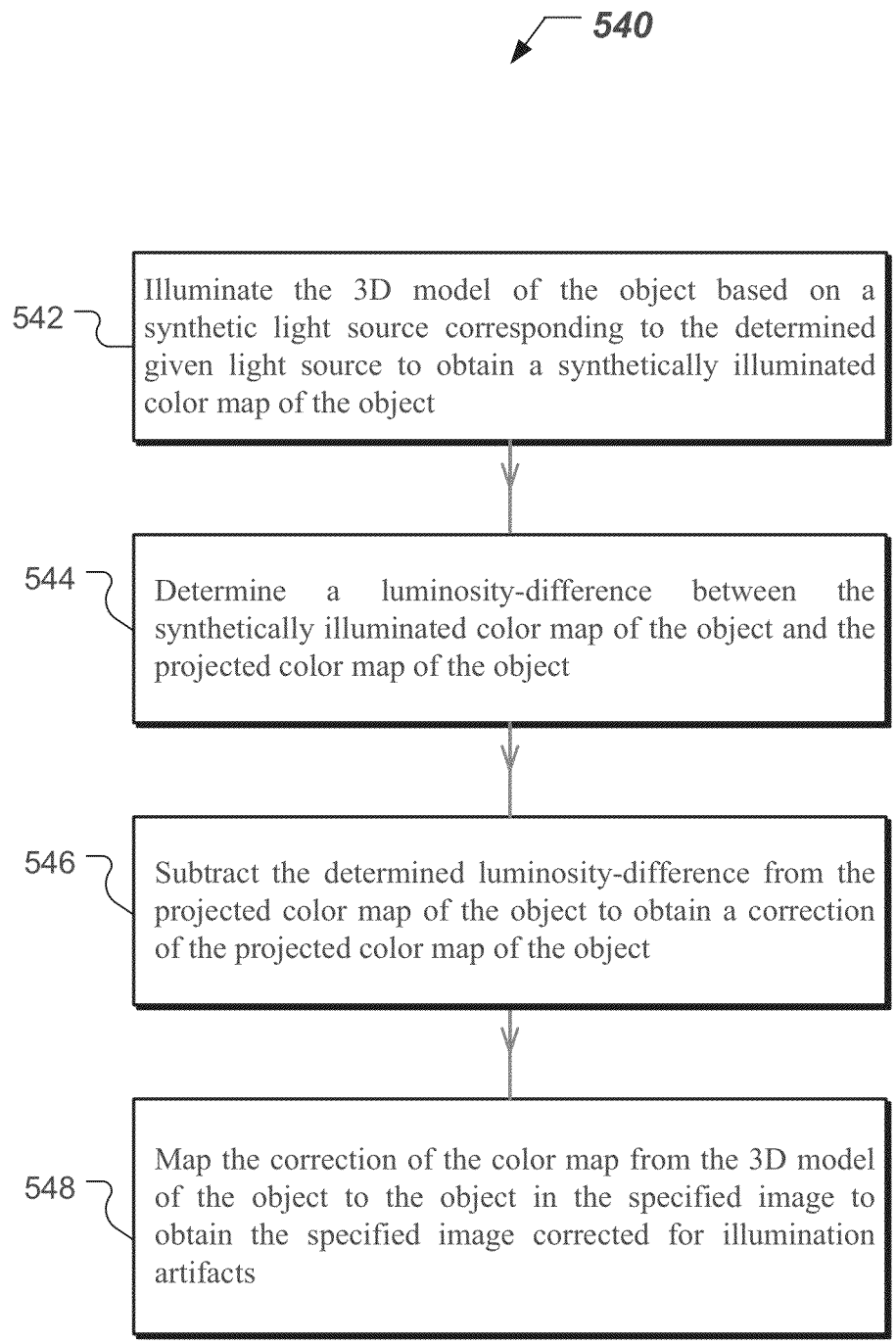

FIGS. 5A and 5B show flow charts of an example process for correcting a specified image of an object for illumination artifacts and for performing object recognition on the corrected image. For example, process 500 can be implemented in system 100. Process 500 begins with the data processor receiving 510 a user specified image of an object. System 100 can provide 520 a 3D model of the object that contains at least a polygon-mesh corresponding to the object's shape. The data processor can further project onto the provided 3D model a color map corresponding to the object in the specified image. Process 500 continues with the data processor determining 530 a given light source that illuminated the object when the specified image was taken. System 100 can determine a location relative to the object and a type of the given light source.

Process 500 continues with the data processor correcting 540 the specified image for illumination artifacts based on the determined type and location of the given light source. Finally, the data processor is configured to perform object recognition 550 for the object in the specified image corrected for illumination artifacts.

To perform the correcting operation 540, the data processor is configured to illuminate 542 the 3D model of the object based on the determined given light source to obtain a synthetically illuminated color map of the object. Operation 540 continues with the data processor determining 544 a luminosity-difference between the synthetically illuminated color map of the object and the projected color map of the object. The determined luminosity-difference can be subtracted 546 from the projected color map of the object to obtain a correction of the projected color map of the object. Finally, the data processor is configured to map 548 the correction of the color map from the 3D model of the object to the 2D image of the object to obtain a 2D image corrected for illumination artifacts.

A multitude of computing devices may be used to implement the systems and methods described in this document, as either a client or as a server or plurality of servers. A computing device can be implemented in various forms of digital computers, such as laptops, desktops, workstations, personal digital assistants, servers, blade servers, mainframes, and other appropriate computers. Another computing device can be implemented in various forms of mobile devices, such as personal digital assistants, cellular telephones, smartphones, and other similar computing devices. Additionally, computing devices can include Universal Serial Bus (USB) flash drives. The USB flash drives may store operating systems and other applications. The USB flash drives can include input/output components, such as a wireless transmitter or USB connector that may be inserted into a USB port of another computing device. The components described here, their connections and relationships, and their functions, are meant to be exemplary only, and are not meant to limit implementations of the inventions described and/or claimed in this document.

A computing device can include a processor, memory, a storage device, a high-speed interface connecting to memory and high-speed expansion ports. The computing device can further include a low speed interface connecting to a low speed bus and a storage device. Each of the above components can be interconnected using various busses, and may be mounted on a common motherboard or in other manners as appropriate. The processor can process instructions for execution within the computing device, including instructions stored in the memory or on the storage device to display graphical information for a GUI on an external input/output device, such as a display coupled to high speed interface. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory can store information within the computing device. In one implementation, the memory can be a volatile memory unit or units. In another implementation, the memory can be a non-volatile memory unit or units. The memory may also be another form of computer-readable medium, such as a magnetic or optical disk.

The storage device can provide mass storage for the computing device. In one implementation, the storage device may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory, the storage device, or memory on processor.

The high speed controller can manage bandwidth-intensive operations for the computing device, while the low speed controller can manage lower bandwidth-intensive operations. Such allocation of functions is exemplary only. In one implementation, the high-speed controller can be coupled to memory, to a display (e.g., through a graphics processor or accelerator), and to high-speed expansion ports, which may accept various expansion cards. In the implementation, low-speed controller can be coupled to the storage device and the low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device may be implemented in a number of different forms. For example, it may be implemented as a standard server, or multiple times in a group of such servers. It may also be implemented as part of a rack server system. In addition, it may be implemented in a personal computer such as a laptop computer. Alternatively, components from computing device may be combined with other components in a mobile device. Each of such devices may contain one or more computing devices or mobile devices, and an entire system may be made up of multiple computing devices and mobile devices communicating with each other.

A mobile device can include a processor, memory, an input/output device such as a display, a communication interface, and a transceiver, among other components. The mobile device may also be provided with a storage device, such as a microdrive or other device, to provide additional storage. Each of the above components is interconnected using various buses, and several of the components may be mounted on a common motherboard or in other manners as appropriate.

The processor can execute instructions within the mobile device, including instructions stored in the memory. The processor of the mobile device may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the mobile device, such as control of user interfaces, applications run by the mobile device, and wireless communication by the mobile device.

The processor of the mobile device may communicate with a user through control interface and display interface coupled to a display. The display may be, for example, a Thin-Film-Transistor Liquid Crystal display or an Organic Light Emitting Diode display, or other appropriate display technology. The display interface may include appropriate circuitry for driving the display to present graphical and other information to a user. The control interface may receive commands from a user and convert them for submission to the processor of the mobile device. In addition, an external interface may provide in communication with processor of the mobile device, so as to enable near area communication of the mobile device with other devices. The external interface may provide, for example, for wired communication in some implementations, or for wireless communication in other implementations, and multiple interfaces may also be used.

The memory stores information within the computing mobile device. The memory can be implemented as one or more of a computer-readable medium or media, a volatile memory unit or units, or a non-volatile memory unit or units. An expansion memory may also be provided and connected to the mobile device through an expansion interface, which may include, for example, a SIMM (Single In Line Memory Module) card interface. Such expansion memory may provide extra storage space for the mobile device, or may also store applications or other information for the mobile device. Specifically, expansion memory may include instructions to carry out or supplement the processes described above, and may include secure information also. Thus, for example, expansion memory may be provide as a security module for the mobile device, and may be programmed with instructions that permit secure use of device. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory, expansion memory, or memory on processor that may be received, for example, over transceiver or external interface.

The mobile device may communicate wirelessly through communication interface, which may include digital signal processing circuitry where necessary. Communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through a radio-frequency transceiver. In addition, short-range communication may occur, such as using a Bluetooth, WiFi, or other such transceiver (not shown). In addition, GPS (Global Positioning System) receiver module may provide additional navigation- and location-related wireless data to the mobile device, which may be used as appropriate by applications running on the mobile device.

The mobile device may also communicate audibly using audio codec, which may receive spoken information from a user and convert it to usable digital information. Audio codec may likewise generate audible sound for a user, such as through a speaker, e.g., in a handset of the mobile device. The sound may include sound from voice telephone calls, may include recorded sound (e.g., voice messages, music files, etc.) and may also include sound generated by applications operating on the mobile device.

The mobile computing device may be implemented in a number of different forms. For example, it may be implemented as a cellular telephone. It may also be implemented as part of a smartphone, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a process executing on a computer system, the method comprising:
    identifying an object of interest in a digital image;
    projecting at least a portion of the digital image corresponding to the object of interest onto a three dimensional (3D) model, the projected portion having a color map;
    determining one or more properties of a light source that illuminated the object of interest in the digital image at a time that the digital image was captured; and
    correcting the digital image for illumination artifacts based, at least in part, upon the one or more determined properties of the light source that illuminated the object of interest in the digital image.

2. The method of claim 1, wherein the act of determining one or more properties of the light source includes determining a type of the light source.

3. The method of claim 2, wherein the act of determining one or more properties of the light source further includes determining a location of the light source relative to the object of interest.

4. The method of claim 1, wherein the act of determining one or more properties of the light source includes determining a location of the light source relative to the object of interest.

5. The method of claim 1, wherein the act of correcting further comprises illuminating the 3D model using the determined light source to obtain a synthetically illuminated color map of the object of interest.

6. The method of claim 5, wherein the act of correcting further comprises determining a luminosity-difference between the synthetically illuminated color map of the object of interest and the projected color map of the object of interest.

7. The method of claim 6, wherein the act of correcting further comprises subtracting the determined luminosity-difference from the projected color map of the object of interest to obtain a correction of the projected color map of the object of interest.

8. The method of claim 7, wherein the act of correcting further comprises mapping the correction of the projected color map from the 3D model of the object of interest to the digital image of the object of interest to obtain a digital image corrected for illumination artifacts.

9. The method of claim 1, wherein the act of determining one or more properties of the light source includes creating a synthetic light source.

10. The method of claim 9, wherein the act of creating a synthetic light source comprises creating a synthetic light source that is an approximation of the light source that illuminated the object of interest in the digital image at a time that the digital image was captured.

11. The method of claim 9, wherein the act of creating a synthetic light source comprises creating a synthetic light source having one or more point light sources.

12. The method of claim 9, wherein the act of creating a synthetic light source comprises creating a synthetic light source having one or more directional light sources.

13. The method of claim 1, wherein the act of determining comprises back-tracing rays that travel from a viewing location relative to the 3D model, to portions of a surface of the object of interest, then reflect off the portions of the surface of the object of interest, and travel in a direction of the light source, wherein the viewing location corresponds to a location relative to the object of interest of a camera that captured the image of the object of interest.

14. The method of claim 1, wherein the digital image comprises a two-dimensional (2D) digital image, and the identified object of interest in the 2D digital image comprises a building, structure, geographical feature, or landmark.

15. The method of claim 1, further comprising determining an orientation of the object of interest in the digital image.

16. The method of claim 1, wherein the act of correcting comprises removing at least one of the following from the digital image: specular reflections, shadows, and highlights.

17. The method of claim 1, further comprising tracking the object of interest in a second digital image, wherein the second digital image is taken at a time after the time that the digital image was taken.

18. A non-transitory computer storage medium encoded with a computer program, the program comprising instructions that when executed by a data processing apparatus cause the data processing apparatus to perform operations comprising:
    projecting onto a provided 3D model a color map corresponding to a light source that illuminated an object of interest in an image at a time that the image was captured;
    selecting specular regions of the projected color map, wherein the specular regions are indicative of specular reflection of light from the light source; and
    determining a location relative to the 3D model of the light source, based at least in part upon back-tracing rays reflecting off the selected specular regions.

19. The non-transitory computer storage medium of claim 18, wherein the determining further comprises:
    back-tracing rays that travel from a viewing location relative to the 3D model, to the selected specular regions, then reflect off the selected specular regions and travel in a direction of the light source, wherein the viewing location corresponds to a location relative to the object of interest of a camera that captured the image of the object.

20. The non-transitory computer storage medium of claim 18, wherein the program further comprises instructions that when executed by the data processing apparatus cause the data processing apparatus to:
    correct the image for illumination artifacts, based at least in part upon the determined location of the light source.

21. The non-transitory computer storage medium of claim 20, wherein the correcting further comprises:
    illuminating the 3D model using the determined light source to obtain a synthetically illuminated color map of the object of interest.

22. The non-transitory computer storage medium of claim 21, wherein the correcting further comprises:
    determining a luminosity-difference between the synthetically illuminated color map of the object of interest and the projected color map of the object of interest.

23. The non-transitory computer storage medium of claim 22, wherein the correcting further comprises:
    subtracting the determined luminosity-difference from the projected color map of the object of interest to obtain a correction of the projected color map of the object of interest.

24. The non-transitory computer storage medium of claim 23, wherein the correcting further comprises:

mapping the correction of the projected color map from the 3D model of the object of interest to the image of the object of interest to obtain an image corrected for illumination artifacts.

25. The non-transitory computer storage medium of claim 20, wherein the correcting comprises removing at least one of the following: specular reflections, shadows, and highlights.

26. The non-transitory computer storage medium of claim 18, wherein the image is a two-dimensional (2D) digital image, and the identified object of interest in the 2D digital image is a building, structure, geographical feature, or landmark.

27. The non-transitory computer storage medium of claim 18, wherein the instructions comprise instructions that when executed by the data processing apparatus cause the data processing apparatus to perform operations further comprising determining an orientation of the object of interest in the digital image.

28. The non-transitory computer storage medium of claim 18, wherein the program further comprises instructions that when executed by the data processing apparatus cause the data processing apparatus to:
track the object of interest in a second image, wherein the second image is taken at a time after the time that the image was taken.

29. A computer system comprising:
a data processor communicatively coupled with a data storage device, wherein the data processor is configured to perform operations comprising:
receiving, at the data processor, a two dimensional (2D) digital image comprising an object of interest;
providing, from the data storage device, a three-dimensional (3D) model that corresponds to the object of interest's shape;
projecting onto the provided 3D model a color map corresponding to a light source that illuminated the object of interest in the 2D digital image at a time that the 2D digital image was captured;
selecting specular regions of the projected color map, wherein the specular regions are indicative of specular reflection of light from the light source;
back-tracing rays that travel from a viewing location relative to the 3D model, to the selected specular regions, then reflect off the selected specular regions and travel in a direction of the light source, wherein the viewing location corresponds to a location relative to the object of interest of a camera that captured the 2D digital image of the object of interest; and
determining a position of the light source relative to the 3D model, based at least in part upon a characteristic of one or more of the back-traced rays.

30. The computer system of claim 29, wherein the data processor is further configured to: determine a type of the light source, based at least in part upon a characteristic of one or more of the back-traced rays.

31. The computer system of claim 29, wherein the providing comprises:
if the 3D model of the object of interest is stored on a data storage device that is communicatively coupled with the computer system, retrieving the stored 3D model of the object of interest from the storage device;
otherwise, retrieving a 3D model of a generic version of the object of interest from the storage device; and
modifying the shape of the 3D model of the generic version of the object of interest to match characteristics of the object of interest in the 2D digital image to obtain the 3D model of the object of interest.

32. The computer system of claim 29, wherein the 3D model further includes a neutral color map that covers the surface of the 3D model, wherein the neutral color map corresponds to the 3D model illuminated by diffuse light such that each hue of the neutral color map has a luminosity of 50%, the operations further comprising:
synthesizing a luminosity map that covers the 3D model based on the determined light source; and
responsive to overlaying the synthesized luminosity map on the neutral color map, reproducing a full-coverage color map that covers the entire surface of the 3D model of the object of interest, the reproduced full-coverage color map corresponding to the illumination conditions of the object of interest when the 2D digital image was captured.

33. The computer system of claim 29, wherein the data processor is configured to perform operations further comprising:
correcting the 2D digital image for illumination artifacts based on the determined position of the light source.

34. The computer system of claim 33, wherein the correcting comprises:
illuminating the 3D model of the object of interest using the determined light source to obtain a synthetically illuminated color map of the object of interest;
determining a luminosity-difference between the synthetically illuminated color map of the object of interest and the projected color map of the object of interest;
subtracting the determined luminosity-difference from the projected color map of the object of interest to obtain a correction of the projected color map of the object of interest; and
mapping the correction of the color map from the 3D model of the object of interest to the 2D digital image of the object of interest to obtain a 2D digital image corrected for illumination artifacts.

* * * * *